R. E. GRIMES.
RECIPROCATING CHURN.

No. 190,578. Patented May 8, 1877.

WITNESSES:
J. Wm Garner
W. S. D. Haines

INVENTOR:
R. E. Grimes
per
F. A. Lehmann
atty.

UNITED STATES PATENT OFFICE.

ROYAL E. GRIMES, OF RUTLAND, OHIO.

IMPROVEMENT IN RECIPROCATING CHURNS.

Specification forming part of Letters Patent No. 190,578, dated May 8, 1877; application filed March 13, 1877.

*To all whom it may concern:*

Be it known that I, ROYAL E. GRIMES, of Rutland, in the county of Meigs and State of Ohio, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in churns; and it consists in the arrangement and combination of parts that will be more fully described hereinafter, whereby a cheap, simple, and efficient churn is produced.

Figure 1:
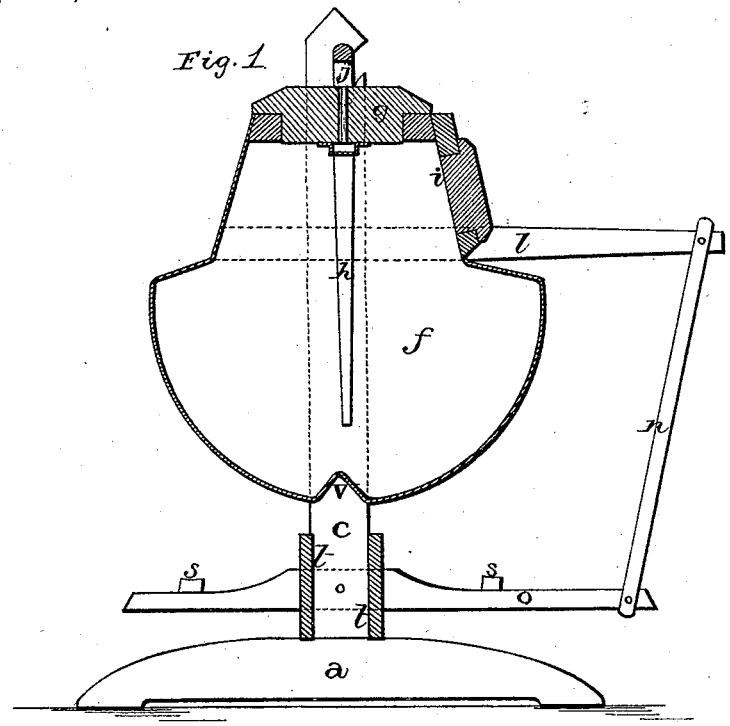
Figure 2:
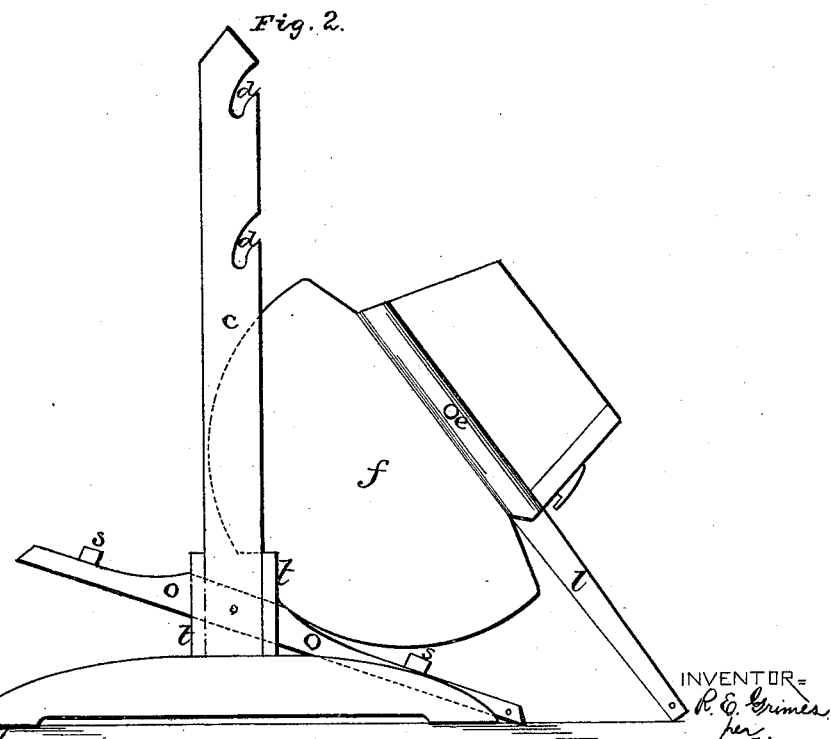

Figure 1 is a vertical section of my invention. Fig. 2 is an end view of the same.

$a$ represents the two ground-sills, from the tops of which rise the two standards $c$, each of which have two or more notches, $d$, cut in their edges, to form bearings for the journals $e$ of the churn-body $f$. This body is of the shape shown, and is provided with the cover $g$, from which depend a number of rods, $h$, which rods reach nearly to the bottom of the churn, and act as stirrers to break the cream-globules as the cream dashes back and forth between them. This cover is fastened down by hooks or any suitable fastenings; has a handle, $j$, on its top, and an air-hole through it, in the usual manner.

Through one of the sides, near the top, is formed an elongated opening, $i$, provided with a suitable cover, and through which the milk can be examined, or poured out, and the butter gathered, without the trouble of taking off the cover.

Fastened to one end of the churn is a lever, $l$, which projects straight out, and which can be used as a lever to tilt the churn and pour its contents out, and to churn by hand, when so desired.

When it is desired to churn with the feet, this lever is connected by the rod $n$ with the pivoted treadle or lever $o$, which is provided with the two foot-rests $s$. When the churn is thus fixed the operator can sit down to the work, and at the same time use his hands at some other work.

The two standards are held and braced together by the two boards $t$, which are separated from each other by the width of the standards.

In the center of the bottom of the churn is made a deep groove, $v$, which not only serves to help agitate the milk more as it is dashed back and forth, but enables the churn to be securely balanced on the top of one of the boards $t$ or tilted forward, the lever resting against the floor or ground, so as to hold it in position while the butter is being gathered.

Having thus described my invention, I claim—

The churn-body $f$, provided with the groove $v$, in combination with the board $t$ and lever $l$, whereby the body can be taken from its journals and tilted forward, as shown.

In testimony that I claim the foregoing I have hereunto set my hand this 1st day of March, 1877.

ROYAL E. GRIMES.

Witnesses:
  G. W. GILES,
  JAMES PETTY.